United States Patent
Meersmann et al.

(10) Patent No.: US 11,926,525 B2
(45) Date of Patent: Mar. 12, 2024

(54) PRODUCTION OF HYPERPOLARIZED GAS

(71) Applicant: The University of Nottingham, Nottingham (GB)

(72) Inventors: Thomas Meersmann, Nottingham (GB); Nicola Simpson, Nottingham (GB); Galina Pavlovskaya, Nottingham (GB)

(73) Assignee: THE UNIVERSITY OF NOTTINGHAM, Nottingham (GB)

( * ) Notice: Subject to any disclaimer, the term of this patent is extended or adjusted under 35 U.S.C. 154(b) by 1156 days.

(21) Appl. No.: 15/758,189

(22) PCT Filed: Sep. 5, 2016

(86) PCT No.: PCT/GB2016/052730
§ 371 (c)(1),
(2) Date: Mar. 7, 2018

(87) PCT Pub. No.: WO2017/042544
PCT Pub. Date: Mar. 16, 2017

(65) Prior Publication Data
US 2018/0244523 A1    Aug. 30, 2018

(30) Foreign Application Priority Data

Sep. 7, 2015  (GB) ..................................... 1515765
Mar. 29, 2016 (GB) ..................................... 1605183

(51) Int. Cl.
*C01B 23/00*     (2006.01)
*B01D 53/00*     (2006.01)
*B01D 53/14*     (2006.01)

(52) U.S. Cl.
CPC ........ C01B 23/0094 (2013.01); B01D 53/005 (2013.01); B01D 53/007 (2013.01); B01D 53/14 (2013.01); *B01D 2251/40* (2013.01); *B01D 2256/18* (2013.01); *B01D 2259/4533* (2013.01); *C01B 2210/0004* (2013.01); *C01B 2210/0009* (2013.01); *C01B 2210/0029* (2013.01); *C01B 2210/0046* (2013.01); *C01B 2210/0053* (2013.01); *C01B 2210/007* (2013.01)

(58) Field of Classification Search
CPC .............. C01B 23/0094; C01D 53/005; C01D 53/007; C01D 53/14
See application file for complete search history.

(56) References Cited

U.S. PATENT DOCUMENTS 2,488,054 A * 11/1949 Davis .................. C01B 21/0612
                                                              423/409
2015/0040758 A1   2/2015 Wolfgang et al.

FOREIGN PATENT DOCUMENTS

| WO | WO 00/78398 A1 | 12/2000 | |
| WO | WO 00/78432 A1 | 12/2000 | |
| WO | WO-0078432 A1 * | 12/2000 | ........... B01D 53/261 |
| WO | WO 2007/136439 A2 | 11/2007 | |

OTHER PUBLICATIONS

Walker et al., Reviews of Modern Physics, (1997), 69(2), 629-642.*
Kyle et al., I&EC Process Design and Development, (1968), 7(3), 447-453.*
International Search Report dated Nov. 7, 2016 in International Application No. PCT/GB2016/052730.

* cited by examiner

Primary Examiner — Yong L Chu
(74) Attorney, Agent, or Firm — Baker Botts L.L.P.

(57) ABSTRACT

A method of removing buffer gas from a mixture comprising the buffer gas and hyperpolarized noble gas is described. The method includes reacting the buffer gas to produce a reaction product different to the buffer gas. The buffer gas may be reactively removed by one or more of oxidation, reduction, polymerization and binding reactions with solid surfaces. The buffer gas may be molecular hydrogen and/or molecular nitrogen. Apparatus for carrying out the method are also disclosed.

11 Claims, 4 Drawing Sheets

PRODUCTION OF HYPERPOLARIZED GAS

CROSS-REFERENCE TO RELATED APPLICATIONS

This application is a U.S. National Stage Patent Application under 35 U.S.C. § 371 of International Application No. PCT/GB2016/052730, filed on Sep. 5, 2016, which claims priority to GB Patent Application Serial No. 1515765.4, filed on Sep. 7, 2015 and GB Patent Application Serial No. 1605183.1, filed on Mar. 29, 2016, the contents of each of which are incorporated by reference herein in their entirety.

FIELD OF THE INVENTION

The present invention relates to hyperpolarized gases, and particularly to methods and apparatus for separating such gases from a buffer gas.

BACKGROUND OF THE INVENTION

A hyperpolarized gas is a gas which has a nuclear spin polarization significantly greater than that which is typical at thermal equilibrium (for example, $10^4$-$10^5$ times higher). Hyperpolarized noble gases have been found useful in magnetic resonance imaging (MRI), as they allow void spaces to be imaged, such as the lungs of a mammal. Typically such structures are difficult to image, as they give off very little signal in traditional MRI. However, if a subject to be imaged inhales a gas mixture including a hyperpolarized gas, the structure of the subject's lungs can be imaged while the hyperpolarized gas remains inside the subject's lungs.

One method of producing hyperpolarised noble gas (hpNG) is via spin-exchange optical pumping (SEOP). In this method, the noble gas to be polarized is mixed with a buffer gas (e.g. in a ratio of 5% noble gas to 95% buffer gas) in the presence of an alkali metal vapour (e.g. rubidium or caesium). Circularly polarised light is used to excite electrons in the alkali metal, and angular momentum from those excited electrons is transferred to the noble gas, enhancing the spin polarization.

Although SEOP is possible with a pure noble gas in the presence of alkali metal vapour, the dilution with a buffer gas strongly increases the level of hyperpolarization (or the spin polarization). This is mainly caused by two effects, (a) by quenching of destructive radiation from the alkali metal atoms, typically obtained through molecular nitrogen ($N_2$), and (b) by increasing the lifetime of the alkali metal (electron) spin polarized state, typically achieved through dilution with helium-4 ($^4He$) or through $N_2$. Typically, the achievable nuclear spin polarization for hpNG increases with increasing noble gas dilution with a buffer gas. Depending on the exact SEOP conditions, the buffer gas can increase the noble gas nuclear spin polarization (and therefore the associated MRI signal intensity) by several orders of magnitude.

Before the hyperpolarized gas can be used in a clinical setting, it must be separated from the physiologically harmful alkali metal (e.g. through condensation at ambient temperature). Furthermore, in order to get high MRI signal intensities removal of the buffer gas is essential, in particular when the noble gas was highly diluted for SEOP. However, hpNG lose polarization over time, an effect that can be accelerated during the separation process. High polarization losses make the hpNG less clinically useful. Currently buffer gases are removed using cryogenic separation. This is a time consuming process, and additional relaxation during cryogenic gas handling can result in some loss of the hpNG polarization (typically up to ⅓ of the polarization is lost in this process).

All stable noble gas isotopes with nuclear spin I>0 are suitable for hyperpolarization. Currently the most commonly used are $^3He$ (helium-3) and $^{129}Xe$ (xenon-129). $^3He$ can be obtained through an alternative technique, i.e. metastability exchange optical pumping (MEOP), and retains its polarization for a relatively long time, having $T_1$ times in the order of tens of hours. However, $^3He$ is scarce and expensive to obtain. The xenon isotope $^{129}Xe$ is much more abundant, but has a significantly shorter relaxation time with $T_1$ times in the order of up to a couple of hours at ambient pressure. Furthermore, lower MRI signal intensities typically arise from hp $^{129}Xe$ compared to those from hp $^3He$, thus making it more demanding to produce for clinical applications. Other stable noble gas isotopes which can be hyperpolarized are $^{21}Ne$ (neon-21), $^{83}Kr$ (krypton-83) and $^{131}Xe$ (xenon-131). However, buffer gas removal through cryogenic separation is not practical for these isotopes due to fast relaxation associated with cryogenic treatment of these isotopes that leads to a rapid decay of the hyperpolarization. Even in the gas phase at ambient temperature, each of these noble gas isotopes has a very short relaxation time, and thus far only $^{83}Kr$ has found any utility for biomedical research. Nevertheless, both $^{83}Kr$ and $^{131}Xe$ are naturally abundant, and thus could potentially be used clinically if a faster way can be found of efficiently separating them from the buffer gas after SEOP.

It is thus an object of the invention to provide an improved method for separating a hyperpolarized noble gas from a buffer gas.

SUMMARY OF THE INVENTION

According to the invention, there is provided a method of removing buffer gas from a mixture comprising the buffer gas and hyperpolarized noble gas, the method comprising reacting the buffer gas to produce a reaction product.

This method results in a hyperpolarized gas product which comprises the hyperpolarized gas and the reaction product, but which is substantially free of the buffer gas.

A used herein, the term "buffer gas" could mean either a pure buffer gas or mixture of buffer gases. "Substantially free of buffer gas" means that the amount of buffer gas remaining mixed with the hpNG is at low enough concentration to not substantially dilute the hpNG (e.g. less than 1%).

The reaction product is preferably either non-gaseous or can easily be removed from the gas phase.

As noted above, the polarization of a hpNG can easily be destroyed, and (in some cases) decays very quickly over time. However, we have found that, surprisingly, reactively removing a buffer gas from a hpNG does not adversely affect the polarization of the hpNG. Furthermore, reactive removal is significantly faster than cryogenic separation, as well as being cheaper and less energy intensive. This could open the way for using other hpNG gases, such as $^{83}Kr$ and $^{131}Xe$, in a clinical setting, as well as providing a more efficient way of producing $^{129}Xe$ (and $^3He$).

Typically, either nitrogen ($N_2$) or helium-4 ($^4He$) is used as a buffer gas during SEOP. We have realised that if a reactive gas (or mixture of gases) is used as a buffer gas, then that gas (or mixture) can be removed from the hpNG mixture by causing it to react, so producing one or more reaction products which can more easily be separated from the mixture.

Any gaseous substance, or mixture of gaseous substances, that (A) can serve as radiation quenching agent for the alkali metal atoms, and (B) can act as a good dilution agent (i.e. that does not cause a too rapid decay of the alkali metal electron spin polarization, as discussed in (b) above), can serve as a buffer gas. When a reactive gas is used, it is also necessary that the buffer gas (or mixture of gases) (C) does not interfere substantially to the SEOP process due to chemical reactions with the alkali metal during the SEOP process (e.g. less than 10% of the alkali metal vapour reacts with the buffer gas over the duration of the SEOP, and preferably less than 1%, or less than 0.01%).

Following SEOP, any suitable reaction may be used to remove the buffer gas, depending on the buffer gas (or mixture of gases) used. Suitable reactions may include oxidation, reduction, polymerisation and binding reactions with solid surfaces (e.g. CO2 on porous calcium oxide). The buffer gas (or gas mixture) may react into one or more reaction products which can be readily removed, preferably at non-cryogenic temperatures, e.g. ambient temperature (about 250K/−23° C.) or above. The buffer gas preferably reacts into one or more reaction products that have significantly increased condensation temperatures compared to the buffer gas (e.g. 50° C. higher, or more). Emphasis added.

Preferably the buffer gas comprises molecular hydrogen ($H_2$). Alternatively, the buffer gas may comprise a hydrocarbon. Further alternatively, the buffer gas may comprise molecular nitrogen ($N_2$).

$H_2$ is particularly useful as a buffer gas because it is an efficient radiation quenching agent and is also a good dilutant for the SEOP process. Furthermore, $H_2$ does not react significantly with the alkaline metal atoms over the timescale used in the SEOP process (e.g. 15 minutes or less, for example, 10, 8 or 6 minutes). Hydrocarbons, in particular those with chemical double and triple bonds, may have similar properties.

$N_2$ is also particularly useful as a buffer gas due to its good radiation quenching and dilutant properties. $N_2$ does not react significantly with the alkaline metal atoms used in traditional SEOP over the timescale used in the SEOP process. Furthermore $N_2$ is naturally abundant and generally non-reactive at room temperature.

Preferably, the reaction is oxidation. The buffer gas may be reacted with an oxidising agent. Alternatively, the buffer gas itself may serves as the oxidising agent.

In the case of molecular hydrogen, oxidation results in water vapour ($H_2O$), which can be easily removed by condensation. Furthermore, water vapour is not harmful if inhaled, in the event that it is not removed completely from the resulting gas product. In the case of other hydrocarbons, such as methane ($CH_4$), oxidation will result in carbon dioxide ($CO_2$), which can be removed from the resulting mixture using $CO_2$ absorbing materials. In the case of hydrocarbon oxidation, it is preferable to avoid carbon monoxide (CO) generation. As an additional safety, CO detectors may be used to ensure that any CO, if present, is below harmful limits within the final product. CO contamination is not a concern if hydrogen is used as a buffer gas.

The buffer gas may be oxidized by combustion, induced plasma or catalytic oxidation. Oxidizing the buffer gas may comprise introducing oxygen ($O_2$) into the mixture comprising the buffer gas and the hyperpolarized noble gas, and combusting the buffer gas. Alternatively, oxidizing the buffer gas may comprise introducing oxygen ($O_2$) into the mixture comprising the buffer gas and the hyperpolarized noble gas in the presence of a catalyst, and catalytically removing the buffer gas. Alternatively, oxidizing the buffer gas may comprise usage of solid oxides. For example, oxidizing the buffer gas may comprise chemical looping combustion. The chemical looping combustion may utilize an oxidizing agent (e.g. a metal oxide) as a source of oxygen for the combustion.

In the case of molecular nitrogen ($N_2$), the $N_2$ itself serves as an oxidation agent. The buffer gas (e.g. $N_2$) may thus be reactively removed by reacting the buffer gas with a substance which can be oxidized by that buffer gas (i.e. by substances that serve as reducing agent for the buffer gas) or that react in some other form with the buffer gas and thereby remove the buffer gas from the gas phase. Examples of suitable substances which can be oxidized by molecular $N_2$ include the alkaline earth metals (e.g. any one or more of beryllium (Be), magnesium (Mg), calcium (Ca), strontium (Sr), and barium (Ba)). Preferably the buffer gas is reacted with magnesium. This results in magnesium nitride, which is a solid at room temperature, and can thus be easily removed from the hpNG following the reaction.

The substance to be oxidized may be provided as a solid, for example as a powder. This helps to ensure a large surface area, and thus improves the contact between the buffer gas and the substance to be oxidized.

The method may further comprise the step of hyperpolarizing a noble gas to produce the hyperpolarized noble gas by spin-exchange optical pumping (e.g. in a SEOP cell). The noble gas is preferably mixed with initial buffer gas before spin-exchange optical pumping such that the noble gas is present at a first concentration. The spin-exchange optical pumping may take place for less than 15 minutes, e.g. 10, 8 or 6 minutes. Alternatively, the spin-exchange optical pumping may take place for longer than 15 minutes.

The method may further comprise introducing an additional buffer gas during SEOP to increase the dilution of the noble gas during SEOP (i.e. to reduce the concentration of the noble gas part way through the SEOP process). The additional buffer gas may be the same gas (or mixture of gases) as the initial buffer gas, or may be a different gas (or mixture of gases) to the initial buffer gas. The additional buffer gas may be introduced at a first predetermined time point during the SEOP, e.g. half way through the SEOP, three quarters of the way through the SEOP, one minute from the end of the SEOP, etc. Alternatively, the additional buffer gas may be introduced once a predetermined nuclear spin polarization level is reached (e.g. 30%, 50%, etc). Alternatively, the additional buffer gas may be introduced gradually over a defined time period (as a function of time and/or polarization level reached). After SEOP, both the initial buffer gas and the additional buffer gas may be reactively removed.

Initially, a high noble gas concentration but low overall SEOP pressure may expedite the SEOP process until a certain nuclear spin polarization level is reached. Once a certain polarization is obtained, the noble gas can be diluted and the total gas pressure increased. This will slow the process down but will also allow for higher polarization values to be reached.

The concentration ramping described above may be combined with ramping of the SEOP temperature, preferably to lower temperatures as the polarization level increases. That is, the temperature in the SEOP cell may be changed (preferably reduced) at a second predetermined time point during the SEOP, e.g. half way through the SEOP, three quarters of the way through the SEOP, one minute from the end of the SEOP, etc. Alternatively, the temperature may be gradually changed (e.g. reduced) during the SEOP process. This can also increase the overall yield of hpNG.

The method may further comprise transporting the hyperpolarized gas and buffer gas mixture after SEOP using further buffer gas. The further buffer gas may be used to transport the hyperpolarized gas and buffer gas mixture to a reaction chamber. For example, the further buffer gas may be used to purge the hyperpolarized gas and buffer gas mixture from a SEOP cell after SEOP is complete (i.e. after a desired spin polarization has been attained). Alternatively, or additionally, the further buffer gas may be used to transport the hyperpolarized gas and buffer gas mixture to a second stage SEOP cell. The further buffer gas may be the same as or different from the buffer gas present during SEOP. The method may then comprise reactively removing the initial and further buffer gas(es) from the hyperpolarised gas (and the addition buffer gas(es), if present).

According to another aspect of the invention, a method of producing hyperpolarized gas is provided, the method comprising:

hyperpolarizing noble gas using spin-exchange optical pumping, the noble gas being mixed with buffer gas for the spin-exchange optical pumping; and
reactively removing the buffer gas from the hyperpolarized noble gas.

According to a further aspect of the invention, there is provided an apparatus for removing buffer gas from a gas mixture comprising the buffer gas and hyperpolarized noble gas, the apparatus comprising: a gas mixture source comprising the gas mixture of the buffer gas and the hyperpolarised noble gas; and a reaction chamber fluidly connected to the gas mixture source, and arranged such that, in use, the buffer gas is reactively removed from the gas mixture in the reaction chamber.

The buffer gas may be any gaseous substance, or a mixture of gaseous substance, that provides suitable quenching and dilution (as discussed above) and that does not substantially interfere with the SEOP process due to chemical reactions with the alkali metal over the timescale of the SEOP process. The buffer gas may be a hydrocarbon. Preferably the buffer gas is hydrogen and/or nitrogen.

The apparatus may further comprise an oxygen source fluidly connected to the reaction chamber, such that, in use, the buffer gas is oxidized in the reaction chamber.

Alternatively, the apparatus may comprise an oxidizing agent (e.g. a metal oxide) present in the reaction chamber. Further alternatively, the apparatus may comprise a substance to be oxidized (e.g. an alkaline earth metal) present in the reaction chamber. The oxidizing agent may comprise a regenerable oxidizing agent (i.e. one which is capable of being regenerated after use by reaction with oxygen). Similarly, the substance to be oxidized may be regenerable (e.g. by reduction with hydrogen) after use. Alternatively, the oxidizing, reducing, or otherwise reacting agent that removes the buffer gas may be non-regenerable, and may be discarded after use.

The apparatus may comprise a catalyst present in the reaction chamber.

The gas mixture source may comprise a first spin-exchange optical pumping (SEOP) cell.

The reaction chamber preferably comprises an inlet for receiving the gas mixture from the gas mixture source, and an outlet. The outlet may be fluidly connected to a condenser operable to remove a reaction product of the buffer gas from the hyperpolarized gas product.

The apparatus may further comprise a further buffer gas source. The further buffer gas source may be fluidly connected to the SEOP cell and may be arranged such that further buffer gas can be used to flush hpNG from the SEOP cell to the reaction chamber.

The apparatus may comprise a second SEOP cell located between the first SEOP cell and the reaction chamber.

According to a further aspect of the invention there is provided a hyperpolarized gas product comprising a hyperpolarized noble gas and a reaction product of a buffer gas, the buffer gas having been present during hyperpolarization of the noble gas by spin-exchange optical pumping.

The buffer gas may be hydrogen, and the reaction product may be water/water vapour. The buffer gas may be nitrogen, and the reaction product may be a metal nitride. The hyperpolarized noble gas may be $^{131}$Xe, $^{129}$Xe, $^{83}$Kr, $^{21}$Ne, $^{3}$He, and any mixture thereof.

The hyperpolarized noble gas may be $^{129}$Xe, and when non-diluted may have a nuclear spin polarization, and thereby an apparent polarization, of greater than 40%, and most preferably greater than 80%. The hyperpolarized noble gas may be $^{83}$Kr, and when non-diluted may have nuclear spin polarization, and thereby an apparent polarization, of greater than 5%, and most preferably greater than 25%.

According to yet another aspect of the invention, a method of producing hyperpolarized gas is provided, the method comprising:

hyperpolarizing noble gas using spin-exchange optical pumping, the noble gas being mixed with an initial buffer gas prior to the spin-exchange optical pumping at a first noble gas concentration; and
introducing an additional buffer gas into the gas mixture so as to reduce the noble gas concentration during the spin-exchange optical pumping.

The initial buffer gas and the additional buffer gas may have the same composition, or may have different compositions. Thus the mixture of buffer gas as well as the concentration can be varied during SEOP if desired. The initial buffer gas and the further buffer gas may be reactive, such that the buffer gas can be reactively removed from the hyperpolarized noble gas after SEOP, as described above.

BRIEF DESCRIPTION OF THE DRAWINGS

Examples of the invention will now be described, by way of example only, with reference to the accompanying drawings, in which.

DETAILED DESCRIPTION

Figure 1:
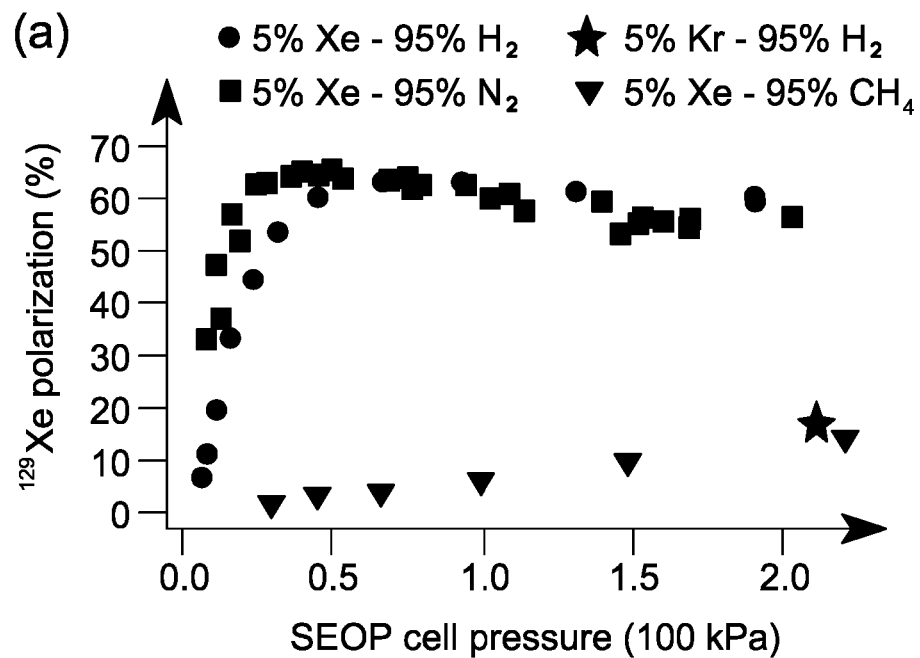
FIG. 1 shows: (a) percentage spin polarization of $^{129}$Xe as a function of cell pressure after 6 minutes SEOP for three mixtures containing 5% Xe and 95% $N_2$ (squares), $CH_4$ (triangles), and $H_2$ (circles), respectively, and for a fourth mixture containing 5% Kr and 95% $H_2$ (star); and, (b) $D_2$ fluorescence as a function of cell pressure during optical pumping of the Rb $D_1$ transition at 378±6 K temperature (measured at the front of the SEOP cell) to explore the radiation quenching properties of $N_2$ (squares), $H_2$ (circles), and $CH_4$ (triangles)
Figure 1:
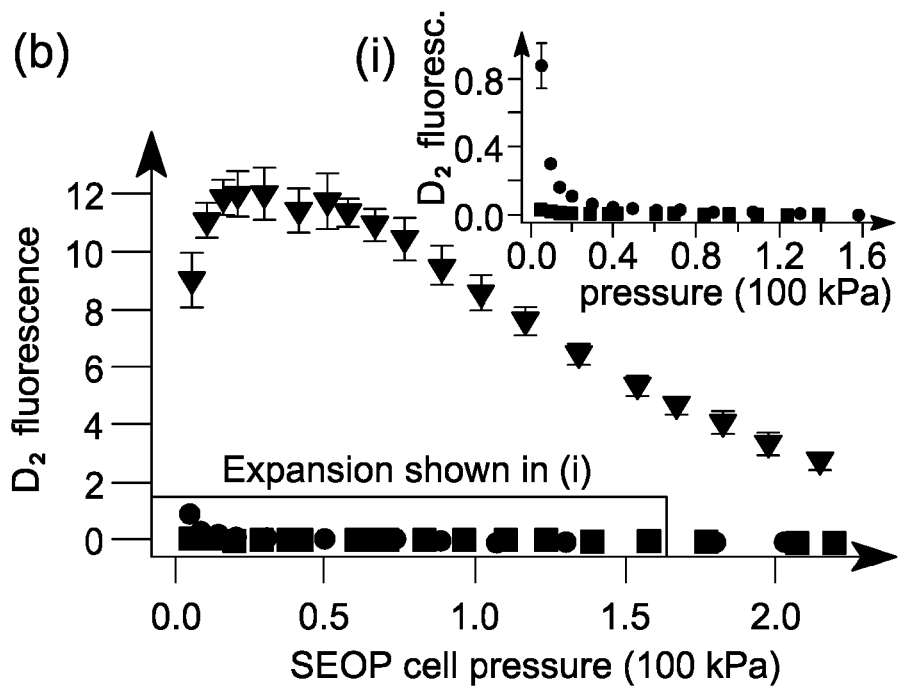

The development of magnetic resonance imaging (MRI) with hyperpolarized (hp) noble gases has resulted in a number of excellent protocols to probe different structural and functional aspects of lungs in health and disease. Technological improvements have enabled pulmonary hp $^{129}$Xe MRI at high spatial resolution, thereby reducing the need for usage of the scarcely available $^3$He isotope. Furthermore, tissue solubility, large chemical shift range, and interaction with specific sensor molecules allow for a variety of biomedical hp $^{129}$Xe applications.

Isotopes with nuclear spin I>½ possess a nuclear electric quadrupole moment. For example, $^{83}$Kr (I=9/2) can be hyperpolarized with rubidium (Rb) spin exchange optical pumping (SEOP). $^{83}$Kr quadrupolar coupling originating from the surface of the SEOP cell has been observed, and $T_2$ relaxation can be used as a probe for surfaces. The intriguing properties of $^{83}$Kr can be more generally utilized after the removal of the reactive Rb vapor to generate surface sensitive MRI contrast. Most recently, $T_1$ surface quadrupolar relaxation (SQUARE) MRI contrast with hp $^{83}$Kr in lungs was demonstrated to be indicative of surface to volume changes in an animal model of emphysema.

Although hp $^{129}$Xe can be obtained through dynamic nuclear polarization (DNP) with high spin polarization levels of up to P=30%, at present only SEOP can produce hp $^{129}$Xe with P≥90%. Furthermore SEOP is the currently the only method to provide hp $^{83}$Kr for viable MRI applications. To obtain high spin polarization the noble gas needs to be diluted with a buffer gas, usually $^4$He and/or $N_2$, during SEOP. Following SEOP, hp $^{129}$Xe is cryogenically (typically at 77K) separated from the gas mixture under carefully chosen conditions to prevent polarization loss. Cryogenic separation is cumbersome for biomedical hp $^{129}$Xe applications (or costly if automated) and is not practical for hp $^{83}$Kr due to the fast quadrupolar relaxation of hp $^{83}$Kr. To avoid cryogenic separation, $^{129}$Xe SEOP at high noble gas mole fraction has been explored in the past. Nevertheless, gas dilution is still necessary to obtain high spin polarization and thus reduces MRI signal intensity per unit volume of inhaled gas. A good measure for the resulting signal intensity is the 'apparent polarization', $P_{app}$, i.e. the spin polarization P scaled by the gas dilution factor. Without cryogenic separation, the best apparent polarization for hp $^{129}$Xe currently reported is $P_{app}$=37% obtained after t>1 h of SEOP. For hp $^{83}$Kr, the highest polarization achieved was P=26% after 8 min of SEOP but, with no method available for gas separation, the highest apparent polarization, to date is $P_{app}$=4% resulting to $P_{app}$=3% after recompression of the gas to ambient pressure.

In an effort to improve the apparent polarization of a hp noble gas, we have attempted SEOP using noble gas mixtures containing alternative buffer gases. We have realized that if a reactive buffer gas is used, then this can subsequently be removed from the hp gas mixture reactively (for example, through catalytic combustion). Our initial experiments, as described herein, concentrated on reactive separation of a buffer gas comprising molecular hydrogen and/or a hydrocarbon from $^{129}$Xe and $^{83}$Kr, which have a naturally abundant isotope distribution (i.e. 26.4% $^{129}$Xe and 11.5% $^{83}$Kr). However, it will be appreciated that the process of reactively removing a buffer gas from a hp noble gas mixture, as described in more detail below, can be used with other hp noble gases if required, and with other buffer gases.

To produce the initial hpNG/buffer gas mixture, SEOP was conducted at 0.05 T field strength in a 120 mm long cylindrical Pyrex cell with 28 mm inner diameter. FIG. 1a shows the $^{129}$Xe nuclear spin polarization, P, after 6 min of SEOP with a 0.2 nm linewidth laser of 23 W incident power at an external cell temperature of 383K as function of pressure of the mixture within the cell. It will be appreciated that the above parameters are particular to the experimental set up which was chosen, and need not be utilized in a clinical setting if not required. The invention described herein focusses on the separation of the hpNG from a buffer gas, rather than on the specifics of how the hpNG is produced initially.

FIG. 1a shows that the spin polarization achieved for a 5% Xe-95% $H_2$ mixture (circles) is strikingly similar to the one produced with a 5% Xe-95% $N_2$ mixture (squares) at 373 K under otherwise identical conditions. This shows that molecular hydrogen works well as a buffer gas. For comparison, the results obtained using a 5% Xe-95% $CH_4$ mixture (triangles) are also shown, and it can be seen that a much lower spin polarization was achieved when using $CH_4$ as a buffer gas. Even so, some increase in polarization was obtained, suggesting that $CH_4$ could also serve as a useful, if less effective, buffer gas.

FIG. 1a also shows the spin polarization achieved in a 5% Kr-95% $H_2$ mixture. It can be seen that a $^{83}$Kr polarization of P=17.5±0.2% was obtained after 10 min of SEOP with 95% $H_2$. This was carried out at 433 K temperature and 2.1 kPa SEOP pressure. Using $N_2$ as buffer gas results similar spin polarization (P=15%) at this pressure after 8 min of SEOP, suggesting that $H_2$ is also effective as a buffer gas for Kr.

The high polarization with the $^{129}$Xe/$H_2$ mixture in FIG. 1a was achieved repeatedly over the course of at least 6 hours despite the formation of rubidium hydrides (RbH) during on-resonance $D_1$ laser irradiation. However, the SEOP cell needed to be kept under operational conditions as cycling to room temperature (and back to SEOP temperature) reduced the spin polarization by a factor of ten, presumably because of a visible thick RbH surface coating within the cell that required thorough cleaning and refilling of the SEOP cell with Rb for further usage. Note that RbH will disassociate to Rb and $H_2$ at higher temperatures (>443 K) and this process may be used for SEOP cell recycling, although this was not further investigated. The $^{131}$Xe $T_1$ relaxation time increases for this spin I=3/2 isotope because of RbH buildup, and RbH surface coating may also reduce the $^{83}$Kr $T_1$ relaxation rates. The effect of RbH surface deposition on the $T_1$ relaxation of $^{129}$Xe as a function of field strength (≥0.08 T) and temperature (≤340K) in a spherical 25 mm diameter cell has been explored, and the results indicate for the current work that $^{129}$Xe would likely exhibit $T_1$ times in excess of 400 s at the high temperature condition during fast SEOP of the Xe/H$_2$ mixtures. Therefore, relaxation by itself should not limit the reachable spin polarization below that obtained in SEOP with Xe/N$_2$ mixtures.

Usually, SEOP mixtures contain at least 5-10% molecular nitrogen for radiation quenching, i.e. to dissipate the energy from electronically excited Rb into the vibrational modes of N$_2$ and therefore to prevent radiation trapping of arbitrarily polarized fluorescence photons that reduce Rb polarization. This is a particular concern at high SEOP temperatures with associated high Rb densities. The efficacy of H$_2$ as a radiation quencher has been studied, and SEOP of dissociated atomic hydrogen has been explored, usually at low SEOP temperature and very low H$_2$ partial pressure. The results presented here in FIG. 1b, monitoring the Rb D$_2$ fluorescence, demonstrate that H$_2$ (circles) serves as an efficient radiation quenching agent. It can be seen that H$_2$ has a sufficient quenching cross section to prevent radiation trapping and, remarkably, H$_2$ is able to effectively prevent radiation trapping even at high temperatures of 383 K and 433 K (for $^{129}$Xe and $^{83}$Kr SEOP, respectively) with associated high rubidium density and 23 W of laser power. At pressures above 40 kPa, it can be seen that there is little difference between N$_2$ (squares) and H$_2$ (circles) as an Rb radiation quenching agent, in agreement with the polarization curves shown in FIG. 1a. The D$_2$ fluorescence recorded when using CH$_4$ as a quenching agent is shown for comparison (triangles), and it can be seen that CH$_4$ is less effective as a quenching agent.

Successful SEOP using buffer gases other than N$_2$, and particularly H$_2$, opens the path for oxidative removal of the buffer gas as an alternative for cryogenic separation.

Furthermore, as discussed in more detail below, we have found that N$_2$ itself can be reactively removed if an appropriate reactant is provided.

Figure 2A:
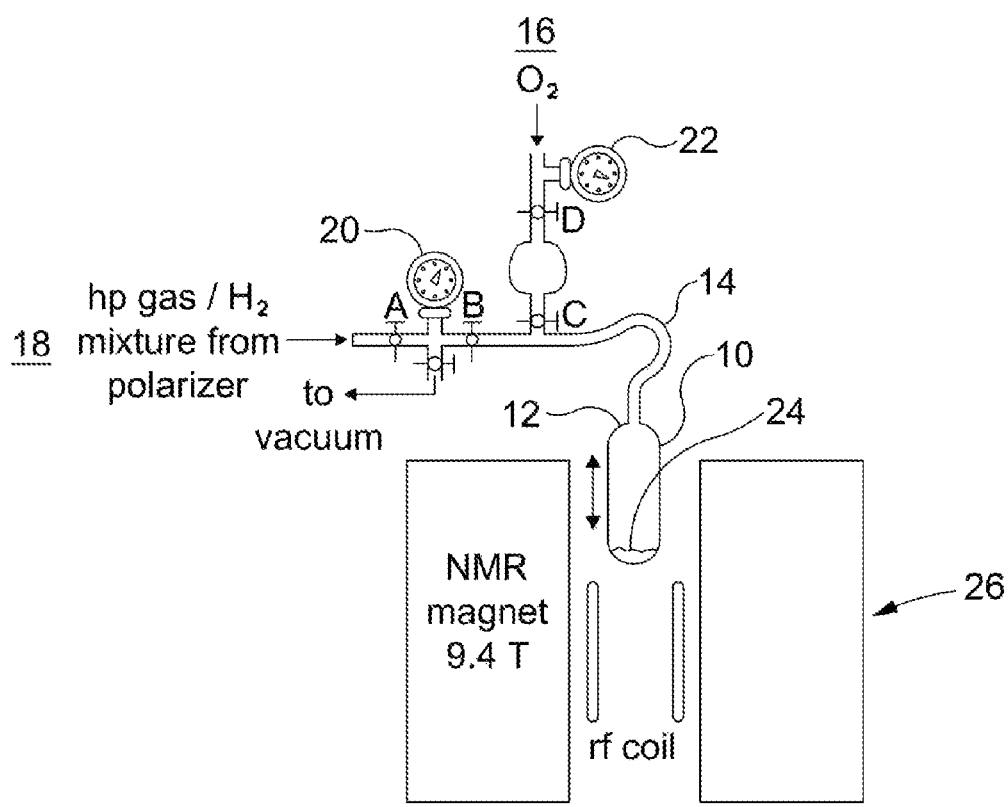
FIG. 2 shows: (A) a schematic of an experimental setup used for buffer gas combustion; and (B) successive images of the combustion experiment at 100 ms, 110 ms, 120 ms, 130 ms, 140 ms and 150 ms.

To test the effect of such oxidative removal on the noble gas spin polarization, a catalytic combustion setup was devised as sketched in FIG. 2a.

The experimental apparatus shown in FIG. 2a includes a reaction chamber 10 having an inlet 12. Fluidly connected to the inlet 12 via a conduit 14 are an oxygen supply 16 and a hpNG mixture supply 18. The hpNG mixture is produced by SEOP in a polarization cell (not shown).

The pressure and delivery of the hpNG gas is controlled by a pair of valves A, B, and monitored by a pressure gauge 20. Similarly, pressure and delivery of the O$_2$ gas is controlled by a pair of valves C, D, and monitored by a pressure gauge 22. A catalyst 24 is provided inside the reaction chamber, for example a Pt/Al$_2$O$_3$ catalyst powder (25 mg, 5 wt. % dry loading Pt on alumina). The reaction chamber itself is, in this example, a 1.5 mm thick glass vessel. The reaction chamber 10 is located within an MRI detection system 26, so that the effect of the combustion on the polarization of the mixture within the reaction chamber can be measured.

Figure 3:
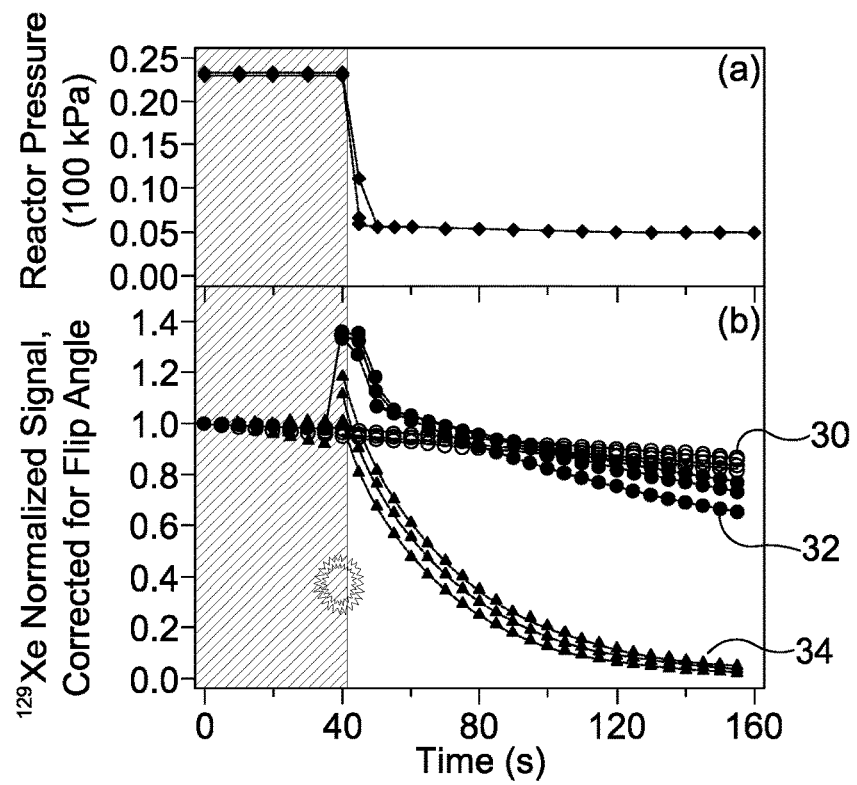
FIG. 3 illustrates NMR experiments of hyperpolarized $^{129}$Xe, during the catalytic oxidation of $H_2$, in a 5% Xe/95% $H_2$ gas mixture: (a) shows separate in situ reactor pressure measurements (diamonds) during the combustion reaction, in which the oxygen reservoir tap was opened at t=40 s; and (b) shows normalized integrated $^{129}$Xe NMR signals following a 9° NMR excitation pulse during the combustion reaction in which the oxygen reservoir tap was opened at t=40 s adding 13.4±0.4 kPa (circles) or 20.5±0.5 kPa (triangles) partial pressure of oxygen. Control signals for a 5% Xe/95% H2 gas mixture with no combustion (oxygen reservoir tap closed) are shown as black open circles.

In the first instance, the hpNG mixture made up of 95:5 H$_2$:hpNG was delivered into the reaction chamber 10 by opening valve B. The signal decay over time was monitored through conventional NMR spectroscopy at 9.4 T in order to provide baseline data 30, shown as open circles in FIG. 3b for hp $^{129}$Xe and in FIG. 4b for hp $^{83}$Kr. This allows the decay of the polarization over time to be compared with the reduction in polarization (if any) resulting from the reaction.

Figure 2B:
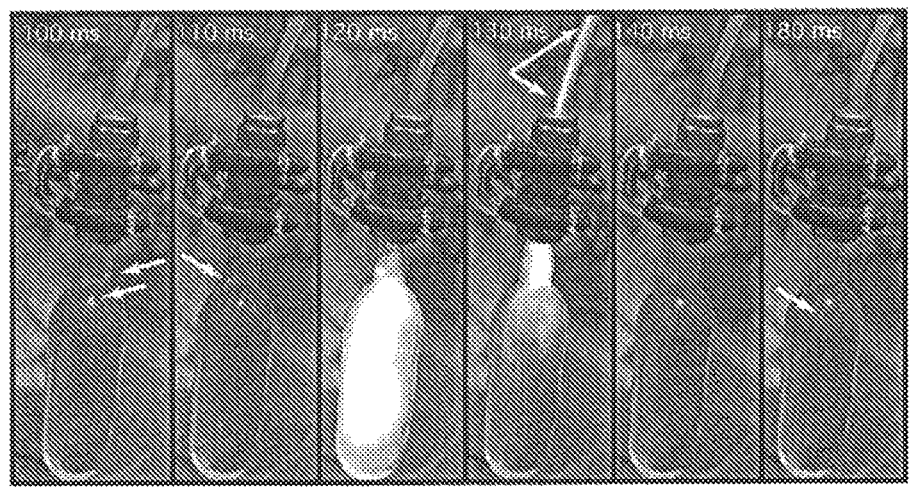

For oxidative H$_2$ removal, molecular oxygen, O$_2$, was added to the hpNG mixture by opening valve C. This led to complete hydrogen combustion within <140 ms, as depicted in FIG. 2b, in which it can be seen that the H$_2$/O$_2$ mixture ignites and burns out completely between t=120 ms and t=140 ms. Note that the pressure of the H$_2$/hp noble gas mixture delivered to the reactor was kept below 30 kPa to avoid excessively high temperatures and associated pressure bursts that might have compromised reactor integrity.

The reactor pressure during this process was monitored (see FIGS. 3a and 4a) but potential short pressure increases during the reaction were not detected at the time resolution of the pressure gauge. Upon adding O$_2$, slightly above the stoichiometric ratio, the pressure decreases within 15 s as the sole reaction product, H$_2$O, condenses rapidly upon cooling. The reactor (outside) temperature increase was limited to 5K and the final reactor pressure observed (4.7±0.5 kPa) was close to that of water vapor at ambient temperature.

Monitoring the hp $^{129}$Xe signal intensity 32 (FIG. 3b, filled circles), an initial signal increase is observed upon O$_2$ delivery, caused by additional hp $^{129}$Xe in the connecting tubing that is pushed into the reaction (and NMR detection) chamber by the O$_2$ gas. Within 20 s, the signal returns approximately to the baseline due to gas convection and diffusion, thereby suggesting that the nuclear spin state experiences no significant depolarization during the catalytic reaction. However, after the reaction, the $^{129}$Xe relaxation is accelerated due to a small excess of paramagnetic O$_2$ (ca. 0.7 kPa partial pressure). Increasing the O$_2$ excess to 7.5±0.5 kPa (filled triangles, 34) leads to further accelerated $^{129}$Xe signal decay. Note that without O$_2$ excess, hp $^{129}$Xe may be stored and accumulated at low pressure.

Figure 4:
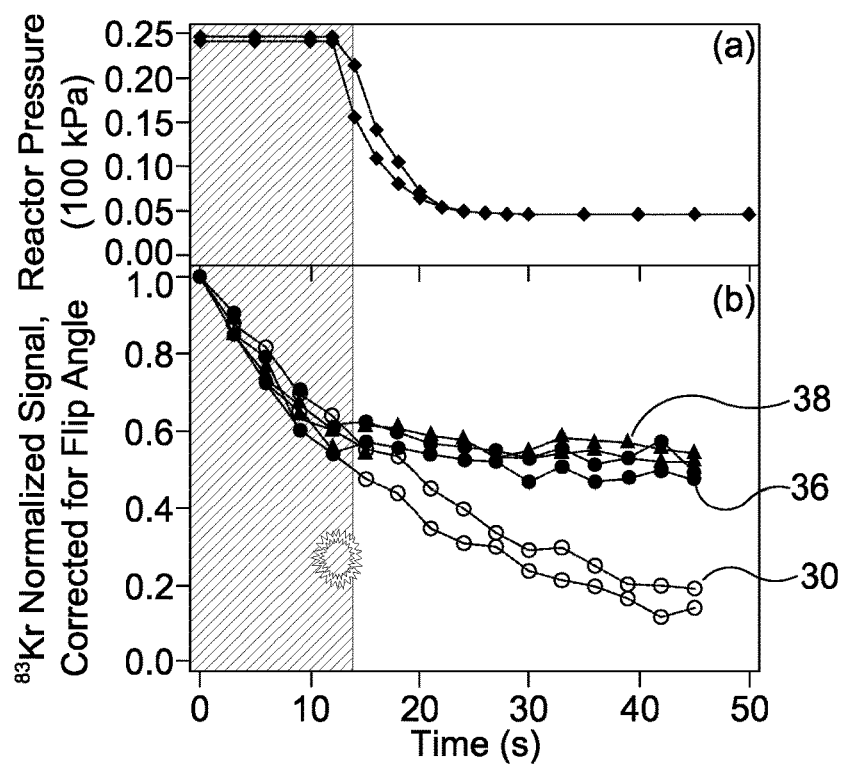
FIG. 4 illustrates NMR experiments similar to those shown in FIG. 3, but with hyperpolarized $^{83}$Kr, during the catalytic oxidation of $H_2$, in a 5% Kr/95% $H_2$ gas mixture: (a) shows in situ reactor pressure measurements (diamonds) during the combustion reaction after opening the oxygen reservoir tap at t=12 s; and (b) shows normalized integrated $^{83}$Kr NMR signals following a 12° pulse during the combustion reaction in which the oxygen reservoir tap opened at t=12 s, thereby adding 13.4±0.4 kPa (circles) and 20.5±0.5 kPa (triangles) partial pressure of oxygen. Black open circles show control signals for a 5% Kr/95% $H_2$ gas mixture with no combustion.

Turning to FIG. 4, the hp $^{83}$Kr data (filled circles, 36) in FIG. 4b shows a different behavior. Firstly, $^{83}$Kr remaining in the connecting tubing will have completely depolarized due to fast quadrupolar $T_1$ relaxation in the presence of the Teflon surface. Therefore, the signal intensity will not display a short term rise as in the case of hp $^{129}$Xe upon O$_2$ gas delivery. This simplifies the data interpretation and the $^{83}$Kr data demonstrates clearly that no signal loss is caused by the combustion. In contrast to $^{129}$Xe, the $^{83}$Kr gas phase relaxation even slows down after the reaction due to the reduced overall pressure and the strong pressure dependence of $^{83}$Kr gas phase $T_1$ relaxation. Due to krypton's very low gyromagnetic ratio γ, its $T_1$ relaxation is only marginally affected by paramagnetic O$_2$, even at higher (7.5±0.5 kPa) oxygen partial pressure (FIG. 4b, filled triangles, 38).

Because of the low total gas pressure after catalytic buffer gas removal, the hp gases will require recompression to (slightly above) ambient pressure for biomedical application. Recompression was recently demonstrated with little polarization loss for hp $^{129}$Xe and acceptable ¼ polarization loss for hp $^{83}$Kr. In conclusion, H$_2$ is a very efficient Rb D$_1$ radiation quenching agent even for very high Rb density at 433 K and can therefore be used as the sole buffer gas in noble gas SEOP. As a consequence, catalytic H$_2$ combustion becomes an alternative to cryogenic hp noble gas separation after SEOP. This suggests that $P_{app}$≥50% might be possible in cryogenics-free hp $^{129}$Xe production using high temperature SEOP at the associated very short pumping times below 10 minutes. The capability of rapid H$_2$ removal also opens up the possibility of hydrogen gas assisted recovery of hp noble gases from equipment, for example through purging of connecting pipelines. In addition, dilution with H$_2$ may reduce relaxation during hp $^{129}$Xe storage at ambient pressure, similar to storage at low pressure. Perhaps the most important result is that hp $^{83}$Kr has been purified without depolarization for the first time, suggesting that $P_{app}>15\%$ has now become feasible (after recompression to ambient pressure) with 23 W laser power. This constitutes a five-fold improvement in MRI signal intensity over previous results that enabled non-slice selective images of ex vivo rodent lungs with $0.795\times0.635$ mm$^2$ resolution in pre-clinical work.

Figure 5:
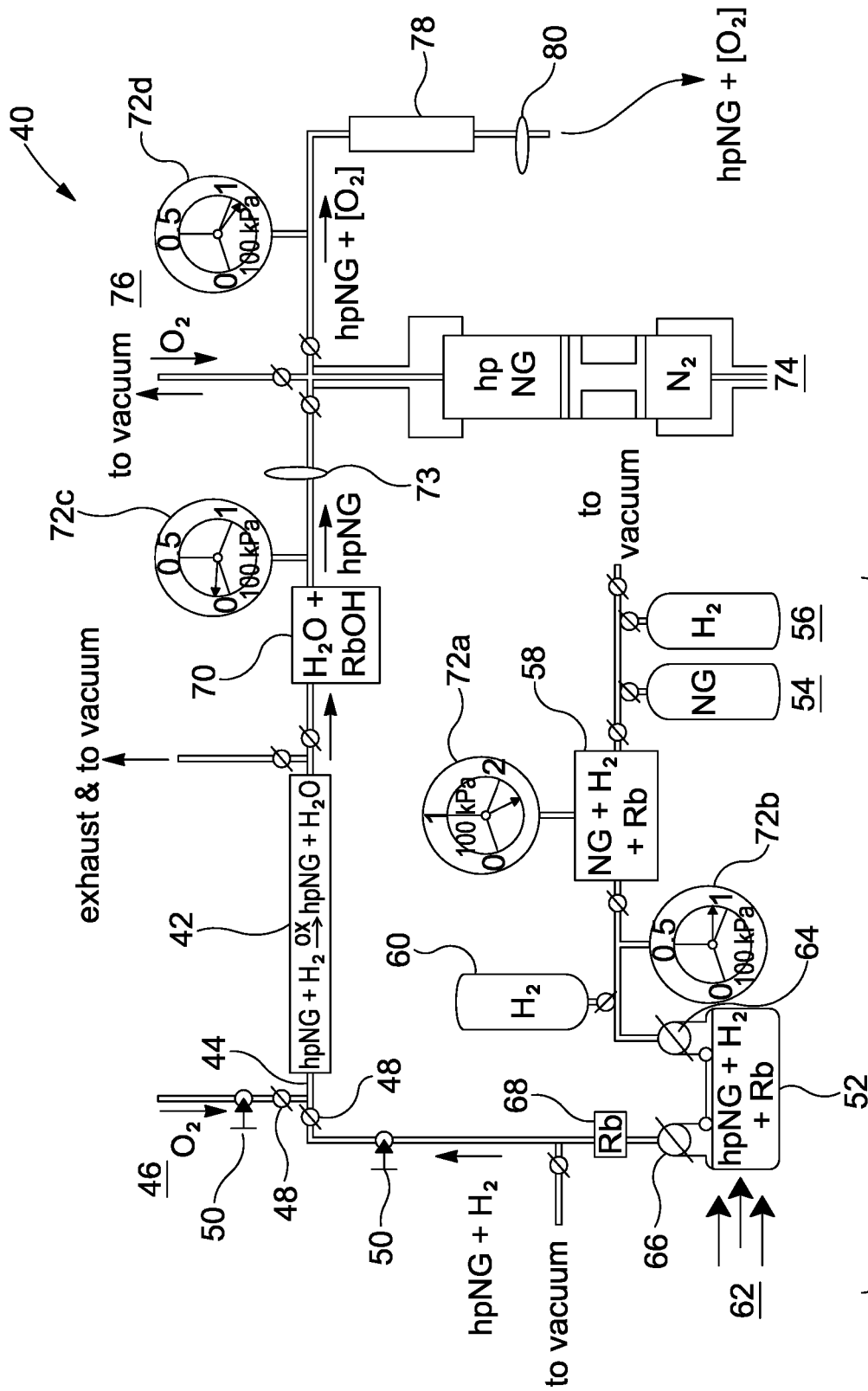
FIG. 5 shows a schematic of an alternative apparatus for producing and purifying hyperpolarized gas.

Turning now to FIG. 5, an example "flow-through" system 40 is depicted. Similar to FIG. 2, the system 40 includes a reaction chamber 42 having an inlet 44 which is fluidly connected to a source of hp gas mixture 45 and to a source of molecular oxygen 46. The delivery of the hp gas mixture and the oxygen is controlled by respective valves 48, and flow controllers 50.

The hp gas mixture is produced via SEOP in a cell 52. A supply of noble gas for polarization 54 and a buffer gas 56 (in this case $H_2$) are provided. A mixing chamber 58 is fluidly connected to the noble gas supply 54 and the buffer gas supply 56 by respective valves. In the mixing chamber, noble gas from the supply 54 is mixed with buffer gas from the supply 56, at high pressure, in this case approx. 230 kPa, as indicated by pressure gauge 72a. If required, the mixing chamber can also contain alkali metal vapor (in this case rubidium) to purify the gases and, in some cases, pre-saturate with alkali metal in preparation for pumping.

After mixing, the gas mixture is expanded into the SEOP cell, leading to a lower pressure in the SEOP cell (in this case approx. 0.9 kPa, as indicated by gauge 72b). A further supply 60 of buffer gas (also $H_2$, although a different buffer gas could be used if required) is provided between the mixing chamber 58 and the SEOP cell 52. This allows the ratio of the buffer gas:noble gas to be adjusted if desired during SEOP and, if a different buffer gas is provided in buffer gas source 60, may also allow the composition of the buffer gas to be adjusted during SEOP. Alternatively, or additionally, the mixture ratio can be adjusted using buffer gas source 56. In the example shown, the initial SEOP ratio is 95:5 buffer gas:noble gas.

In the SEOP cell the noble gas/buffer gas/alkali metal vapor mixture is irradiated with circularly polarized laser light 62, resulting in hyperpolarization of the noble gas. Irradiation is conducted with inlet valve 64 and outlet valve 66 closed. When sufficient polarization has been achieved (e.g. after about 10 minutes), outlet valve 66 is opened, and the hp gas mixture is drawn out of the SEOP cell into the reaction chamber 42, via an alkali metal removal trap 68.

If it is required to adjust the temperature in the SEOP cell during SEOP, the temperature can be temporarily changed through the addition of the buffer gas and/or through temperature regulation of the SEOP cell using a heater (not depicted).

After SEOP the gas mixture is released through opening of valve 66 and the rubidium vapor is removed through a filter 68. The gas streams through a flow regulator 50 into the reactor chamber 42. Gas transport is accomplished through pressure equalization (discussed more fully below). In addition $H_2$, or a hydrocarbon gas, (e.g. from buffer gas source 60 or 56) can be used to purge remaining hpNG and to transport hpNG through the connecting tubing.

As discussed previously in relation to FIG. 2, in the reaction chamber the hp noble gas/buffer gas mixture is mixed with molecular oxygen to reactively remove the buffer gas. In this case, the buffer gas (hydrogen) is removed by catalytic oxidation: a catalyst, typically platinum or palladium, or an oxide thereof present in the reaction chamber facilitates the reactive removal of the buffer gas without combustion.

Alternatively, a chemical looping agent is used that serves as oxidation agent and that can be recycled later with molecular oxygen gas. In this way the buffer gas is never mixed with molecular oxygen providing a very safe reaction system. If a metal oxide is used as an oxidation agent, $O_2$ gas may be used to regenerate the metal oxide at a later time after buffer gas removal is completed.

The resulting mixture, which is substantially free from buffer gas, is drawn through a condensation chamber 70, in which water vapor resulting from the reaction, and any remaining alkali metal, is removed via condensation. If a hydrocarbon was used as buffer gas (or one of the buffer gases), a $CO_2$ getter (not shown) will also need to be included.

Because the buffer gas has been removed the pressure drops significantly (see pressure gauge 72c, approx. 0.1 kPa). This pressure drop enables gas transport though pressure equalization until the gas mixture is almost entirely removed from the SEOP cell. As noted above, further buffer gas from source 56 or 60 can be used to purge remaining hpNG from the cell and connecting tubing if required. The purified hpNG that is substantially free from buffer gas continues to flow through a hydrogen detector 73 (and if needed through a CO detector) into a pre-evacuated storage volume 74 that also serves as a pneumatically operated, single piston recompression unit. Alternatively, other pumps, such as a peristaltic pump, could be used for recompression of the hpNG to the desired high pressure (for example, slightly above ambient pressure as indicated by the pressure gauge 72d).

If it is intended to use the purified hp noble gas in a clinical setting (e.g. for lung MRI), the hp noble gas can be mixed with oxygen from a compression oxygen supply 76. The hp gas/oxygen mixture can then be delivered directly to the application (e.g. to a patient for inhalation).

Before recompression, the hpNG may be stored for some time at low pressure. Furthermore, before recompression, $O_2$ may be added to produce a breathable mixture after recompression. If a mixture containing hpNG and $O_2$ is produced for biomedical applications, another reactor 78 may be used to further ensure a very high level of $H_2$ removal (and if applicable, CO removal to physiologically safe levels). A final $H_2$ detector 80 (and, if applicable, CO detector) ensures production of a physiologically safe, non-reactive gas that is released for MRI usage and other applications. Other applications may include NMR spectroscopy, NMR relaxometry, and usage of hpNG as nuclear spin polarized targets.

Although the present invention has been described above primarily with respect to oxidative removal of a hydrogen buffer gas, it will be appreciated that other reactive buffer gases could be used, so long as those gases provide an effective buffer during SEOP, and effective quenching. If required, a mixture of reactive buffer gases could be used to achieve the desired properties. Depending on the buffer gas selected, a reaction other than oxidation might be appropriate, such as polymerisation or reaction with a solid surface. Hydrogen and oxidation work well together, however, as the reaction product (water) is easily removed and is not biologically harmful.

One such alternative buffer gas is molecular nitrogen ($N_2$). As discussed above, $N_2$ is known to be an effective quenching agent and dilutant. However, it has previously been thought necessary to remove $N_2$ cryogenically. In contrast, we have realised that $N_2$ can be removed reactively, resulting in a cheaper and quicker method for separating hpNG from the $N_2$ buffer gas.

Unlike $H_2$, $N_2$ is not reacted with an oxidation agent, rather $N_2$ itself serves as the actual oxidation agent of a suitable substance, such as a metal that serves as a reducing agent. Reactive $N_2$ removal thus replaces cryogenic $N_2$ removal, currently being used.

As an example, $N_2$ may be reacted with magnesium metal at high temperatures to produce magnesium nitride. Other alkaline earth metals may also be used for this purpose—for example Ca, Sr, Ba. This reaction can be accomplished in a flow through reactor similar to the one presented in FIG. 5 for the hydrogen gas removal.

In such a system the reactive removal of $N_2$ would still take place in the reaction chamber 42. However, rather than providing an external source of oxygen gas 46 or an oxidizing agent within the reaction chamber, a reducing agent (i.e. substance to be oxidized), such as an alkaline earth metal, would be provided in the reaction chamber 42 instead. The $N_2$ buffer gas can thus be used to oxidize the metal within the reaction chamber, thus reactively removing the $N_2$ from the hpNG.

All other components of the flow through reactor 40 would remain unchanged, and therefore will not be described again here.

An example of an oxidation reaction for the reactive removal of nitrogen would be:

$$HPNG+N_2+3Mg \rightarrow HPNG+Mg_3N_2(s)$$

This is a 'combustion' reaction in which $N_2$ reacts with metallic magnesium to produce magnesium nitride (s=solid). As discussed above, heating can be provided for the reaction chamber, for example in the form of inductive heating, to maintain the chamber at an appropriate temperature for the reaction.

Magnesium metal may be provided in a temperature resistant ceramic tube as a wire, surface coating, surface wash of magnesium powder or magnesium nano particles, or just as a tube filled with magnesium powder or nano particles. Generally, the higher the surface area of the magnesium the better, as this improves the contact area with the $N_2$ gas and thus increases the efficiency of the reaction.

Magnesium nitride is typically a solid at room temperature, and thus can easily be separated from the hpNG after the reaction is complete.

If required, the magnesium metal can be recycled after use via reduction of the magnesium nitride. An example recycling process might involve the following reactions:

$$Mg_3N_2(s)+6H_2O(g) \rightarrow 3Mg(OH)_2(s)+2NH_3(g) \quad 1.)$$

$$\text{heating: } Mg(OH)_2(s) \rightarrow MgO(s)+H_2O(g) \quad 2.)$$

$$\text{reduction: } MgO+H_2(g) \rightarrow Mg+H_2O \quad 3.)$$

Note that magnesium hydride decomposes above 300° C. and should therefore not be formed if the temperature is kept high enough. (s=solid, g=gas).

It can thus be seen that reactive separation of nitrogen buffer gas from hpNG is a viable alternative to the cryogenic separation process which is traditionally used.

The invention has been described primarily in relation to a buffer gas/noble gas mixture having a ratio of 5% noble gas to 95% buffer gas. Other ratios could be used if required. For example, the very high laser power that has become available recently enables a high level of polarization in mixtures containing 50% xenon. Higher noble gas concentration reduces the required volume of the SEOP cell and can be advantageous.

With the ratios and gases discussed above, we have found that SEOP times of less than 15 minutes produce sufficient polarization for use clinically. Indeed SEOP of less than 10 minutes, and in some cases less than 8, 6 or 5 minutes is sufficient. However, for other applications, where more polarization is required, longer SEOP times may be used.

One path to expedite the SEOP time is to change the gas mixture during SEOP. This can be further assisted by selecting a temperature that optimises SEOP for the particular mixture. For example, lower levels of polarization can be reached with less than ideal mixtures and temperatures but at a high production rate. Once a certain polarization level is reached the mixture is optimized for slower SEOP that further increases the polarization. For example a 50% NG, 50% $H_2$ mixture at low pressure of 50 kPa could be used to reach an initial spin polarization of P=5-10% for $^{83}$Kr (or of P=30-50% for $^{129}$Xe) after which the total pressure can be increased by further $H_2$ addition leading to a 25% NG; 75% $H_2$ mixture. SEOP can then continue until the desired polarization level is reached. Alternatively, the obtained 25% NG; 75% $H_2$ mixture may be transferred into a second SEOP cell of larger volume to continue the SEOP process at lower pressure.

When recompressed, we have been able to produce hyperpolarized $^{129}$Xe having an apparent polarization of greater than 40%, and in some cases greater than 50%, by this process using relatively low laser power (i.e. 23 W). Similarly, when recompressed, we have been able to produce hyperpolarized $^{83}$Kr having an apparent polarization of greater than 10%, and in some cases greater than 15%, by this process.

The invention claimed is:

1. A method of producing a hyperpolarized noble gas, comprising:
    mixing a noble gas with an initial buffer gas to form a mixture such that the noble gas is present in the mixture at a first concentration;
    spin-exchange optical pumping the mixture to hyperpolarize the noble gas; and
    removing the buffer gas from the mixture so as to isolate the hyperpolarized noble gas whilst maintaining the hyperpolarization by:
    reacting the buffer gas present in the mixture comprising the buffer gas and hyperpolarized noble gas to produce a reaction product different to the buffer gas, wherein reacting the buffer gas comprises at least one of:
        (i) oxidising the buffer gas by one or more of combustion and induced plasma;
        (ii) introducing oxygen ($O_2$) into the mixture comprising the buffer gas and the hyperpolarized noble gas, and combusting the buffer gas;
        (iii) introducing oxygen ($O_{o2}$) into the mixture comprising the buffer gas and the hyperpolarized noble gas in the presence of a catalyst, and catalytically removing the buffer gas;
        (iv) passing the mixture comprising the buffer gas and the hyperpolarized noble gas over or through an oxidizing agent; and
        (v) oxidizing an alkaline earth metal using the buffer gas.

2. The method of claim 1, wherein the buffer gas reacts into one or more reaction products which can be removed at temperatures of at least 250 degrees Kelvin.

3. The method of claim 1, wherein the buffer gas is at least one of (i) molecular hydrogen ($H_2$); (ii) a hydrocarbon; and (iii) molecular nitrogen ($N_2$).

4. The method of claim 1, wherein the reacting the buffer gas comprises passing the mixture comprising the buffer gas and the hyperpolarized noble gas over or through an oxidizing agent, and wherein:
(i) the oxidizing agent is a chemical looping combustion agent, or
(ii) the method further comprises discarding the oxidizing agent after use.

5. The method of claim 1, further comprising the step of separating the one or more reaction products from the hyperpolarized noble gas, wherein the buffer gas is molecular hydrogen ($H_2$) and the reaction product is water vapour ($H_2O$), and wherein the step of separating comprises condensing the water vapour to separate it from the hyperpolarized noble gas.

6. The method of claim 1, wherein the noble gas is mixed with initial buffer gas before the spin-exchange optical pumping such that the noble gas is present in the mixture at a first concentration, and wherein additional buffer gas is introduced into the mixture during the spin-exchange optical pumping to reduce the concentration of noble gas.

7. The method of claim 6, wherein the additional buffer gas comprises a different gas to the initial buffer gas, such that the composition of the buffer gas is altered during the spin-exchange optical pumping.

8. The method of claim 6, wherein the buffer gas is selected such that it does not react significantly during the spin-exchange optical pumping.

9. The method of claim 6, wherein the spin-exchange optical pumping takes place for ten minutes or less.

10. The method of claim 6, further comprising purging the mixture comprising the buffer gas and the hyperpolarized noble gas from the SEOP cell using further buffer gas.

11. The method of claim 10, wherein the further buffer gas is operable to transport the mixture comprising the buffer gas and the hyperpolarized noble gas from the SEOP cell into a second SEOP cell, and wherein the method comprises further hyperpolarizing the noble gas by second spin-exchange optical pumping to increase the hyperpolarization level.

* * * * *